United States Patent [19]
Ashbey

[11] Patent Number: 5,541,642
[45] Date of Patent: Jul. 30, 1996

[54] STEREOSCOPIC IMAGING SYSTEMS

[75] Inventor: James A. Ashbey, London, United Kingdom

[73] Assignee: Delta Systems Design Ltd., London, United Kingdom

[21] Appl. No.: 78,241

[22] PCT Filed: Dec. 23, 1991

[86] PCT No.: PCT/GB91/02313

§ 371 Date: Jun. 21, 1993

§ 102(e) Date: Feb. 25, 1994

[87] PCT Pub. No.: WO92/11735

PCT Pub. Date: Jul. 9, 1992

[30] Foreign Application Priority Data

Dec. 21, 1990 [GB] United Kingdom ............ 9027881

[51] Int. Cl.[6] ................................. H04N 13/04
[52] U.S. Cl. .............................. 348/59; 359/464
[58] Field of Search ..................... 348/57, 58, 59, 348/60; 359/464; H04N 13/04

[56] References Cited

U.S. PATENT DOCUMENTS

| | | | |
|---|---|---|---|
| 2,566,700 | 9/1951 | Goldsmith | 348/46 |
| 2,865,988 | 12/1958 | Cafarelli, Jr. | |
| 2,983,835 | 5/1961 | Frey | |
| 3,275,745 | 9/1966 | Var | 348/57 |
| 3,529,082 | 9/1970 | Hoesli | 348/54 |
| 3,858,001 | 12/1974 | Bonne | 348/57 |
| 4,122,484 | 10/1978 | Tan | 348/58 |
| 4,692,792 | 9/1987 | Street | |
| 4,719,482 | 1/1988 | Hora | |
| 5,162,897 | 11/1992 | Jitsukata | 348/59 |

FOREIGN PATENT DOCUMENTS

| | | |
|---|---|---|
| 1523436 | 8/1978 | Germany |
| 2111798 | 7/1983 | Germany |

Primary Examiner—Howard W. Britton
Attorney, Agent, or Firm—Louis Weinstein

[57] ABSTRACT

A pair of stereoscopic images are displayed on alternate horizontal lines on a display and a decoder screen makes one image available to a viewer's left eye and the other to his right eye. In the case of a video signal the two images are carried on a pair of interlaced video fields. Decoders for such images can operate by polarizing the two images or by applying color filters to each of the two images.

5 Claims, 14 Drawing Sheets

HORIZONTAL COLUMN INTERLEAVING

CATHODE RAY TUBE

TWO IMAGES LINE (COLUMN) INTERLEAVED ON CRT SCREEN

HIGHEST RESOLUTION LINE HORIZONTAL GRID

Fig. 2b

WHEN IMAGES ARE HORIZONTALLY INTERLEAVED ON A LINE (SCAN LINE) BY LINE BASIS, THE TWO OBJECTS APPEAR AS A 50-50 DISSOLVE.

TWO IMAGES:

COLOUR 1 – □
COLOUR 2 – ○

SUPERIMPOSED TOGETHER
ON THE CRT SCREEN

*Fig. 6*

POLARIZING FILTER COVERS
BLOCK OF NINE PIXELS

POLARIZING RASTER LENTICULAR HYBRID
HAS TWO BASIC DESIGNS:
(i) THE R.L.H HAS BLACK AND CLEAR SECTIONS WHICH ARE PATTERN CORRELATED WITH A POLARIZING FILTER ATTACHED BEHIND IT.
(ii) THE R.L.H. HAS POLARIZED AND CLEAR SECTIONS, I.E., THE R.L.H. ITSELF CONTAINS THIN SECTION POLARIZED SECTIONS WHICH ARE RE-ALIGNED BY PROPERTY OF THE LENTICULAR SECTION.

Fig. 10

DISPLACED IMAGES ARE NOW NO LONGER INTEGRATED WITHIN THE SIGNAL, THEY ARE PURE AND DISCRETE BUT ARE OPTICALLY INTEGRATED BY THE ACTION OF THE SCANNING PROCESS OF THE CRT.

1. CONVENTIONAL SIGNAL

3. 3-D SIGNAL

*Fig. 13c*

STEREOSCOPIC IMAGING SYSTEMS

This invention relates to imaging systems of the type described in our International patent applications Nos. WO90/13848 and PCT/GB91/01318 to which reference should first be made.

International patent application No. WO90/13848 there is described a system in which a stereoscopic pair of images are displayed on a screen with a lateral shift between the two images and a decoder screen is provided whereby a viewer can see one image of the pair with the right eye and the other image of the pair with the left eye. The images are displayed as, for example, a series of alternating vertical stripes of the two images. The decoder screen comprises a series alternating opaque and transparent vertical stripes arranged such that the left eye will see the vertical stripes of one image of the stereoscopic pair through the transparent stripes whilst the black stripes mask the stripes of the second image of the pair. The right eye will see the second image of the pair through the transparent stripes whilst the black stripes mask out the first image.

The images displayed may be a genuine stereoscopic pair derived from two cameras viewing a scene. Preferably a lateral shift between the images of the pair is used in displaying them upon the screen.

The system can also derive stereoscopic effects from a monoscopic source by displaying successive frames produced by the source simultaneously on the screen with a lateral shift between the two images. The relative displacement of moving objects in the scene creates a sense of depth for the viewer.

It has been proposed to use a lenticular grid in front of the screen on which the pair of images is displayed and carrying a pattern of alternating clear and opaque areas in contact with lenticular array whereby the apparent pattern of clear and opaque areas perceived by one of the viewer's eyes is the inverse of the apparent pattern perceived by the viewer's other eye. This raster lenticular hybrid decoder screen delivers two clear sharp images with the stereo differences contained between them one to each eye.

When using such an arrangement for display on a horizontally scanned raster screen such as a television screen complex software is required to produce the alternating vertical stripes of the two images of the pair. This is because each horizontal line has to be chopped at a plurality of positions across its width.

Preferred embodiments of the present invention provide an imaging system in which the horizontal scan of a video signal is used to slice the two images of the stereoscopic pair together.

Various aspects of the invention are defined in the appended claims to which reference should now be made.

Preferred embodiments of the invention will now described in detail by way of example with reference to the accompanying drawings.

In television systems such as PAL and NTSC each frame of video data is displayed as a pair of interlaced fields on the screen. This arrangement is well known. This gives an ideal format in which a stereoscopic pair of images can be combined for display on a cathode ray tube by displaying alternate fields of a stereoscopic pair on a video screen. A field of a first image of the pair is displayed and then a field of a second image of the pair as a single frame interlaced together. Lateral shift between the two fields can be implemented in a well known manner. If the images are originally derived from a monoscopic source and thus come from successive frames there will also be a time displacement between the two images.

Figure 1:
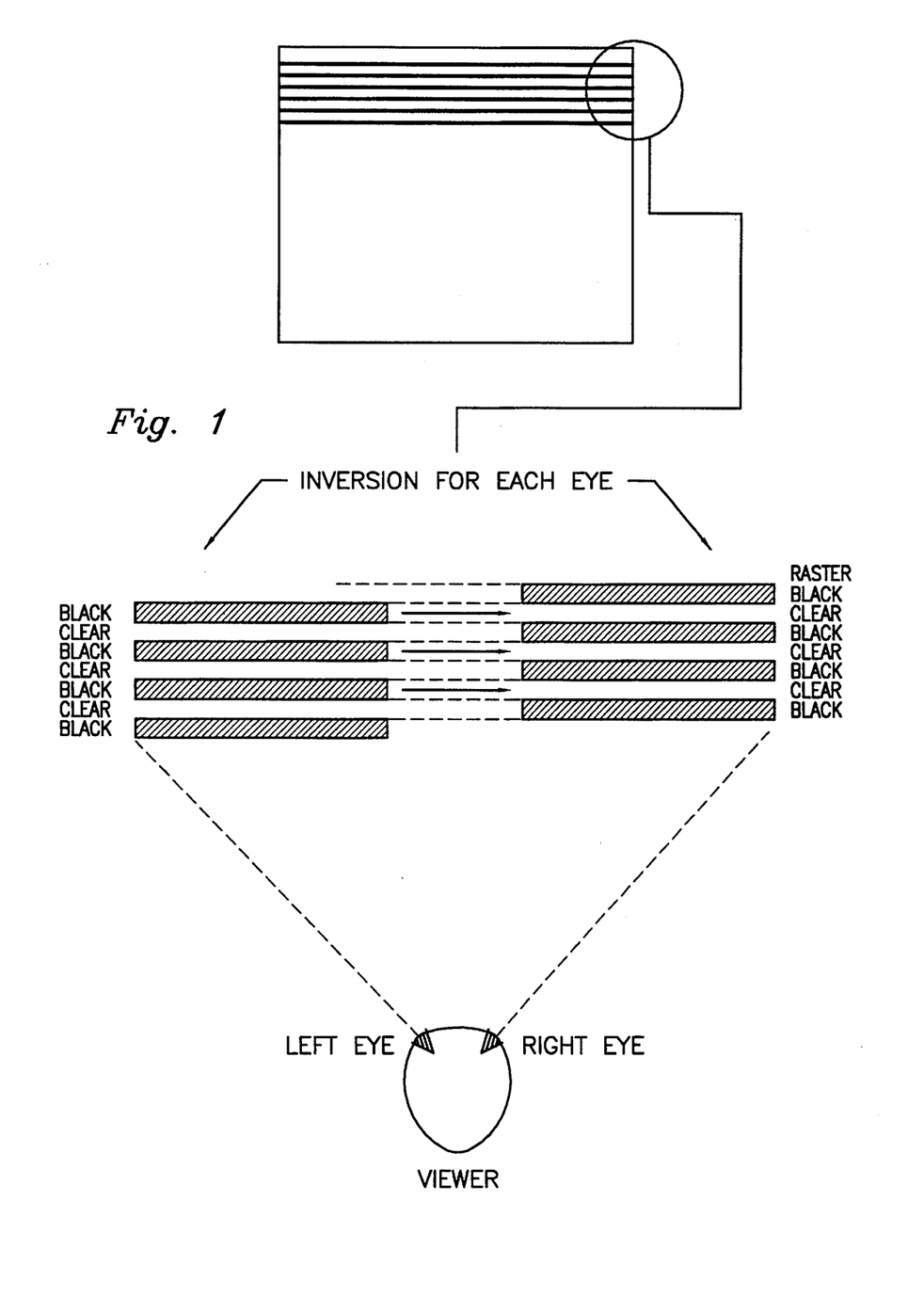
FIG. 1 shows the horizontal patterns seen by the left and right eyes in an embodiment of the invention.

A decoder screen for an image so displayed will comprise a horizontal Raster Lenticular Grid arranged such that a viewer's left eye will see horizontal lines from a first field with lines from the second field masked out whilst the right eye will see the lines from a second field with the first field masked out. This is illustrated in FIG. 1. As can be seen the pattern seen by the left eye is the inverse of the pattern seen by the right eye.

Figure 2A:
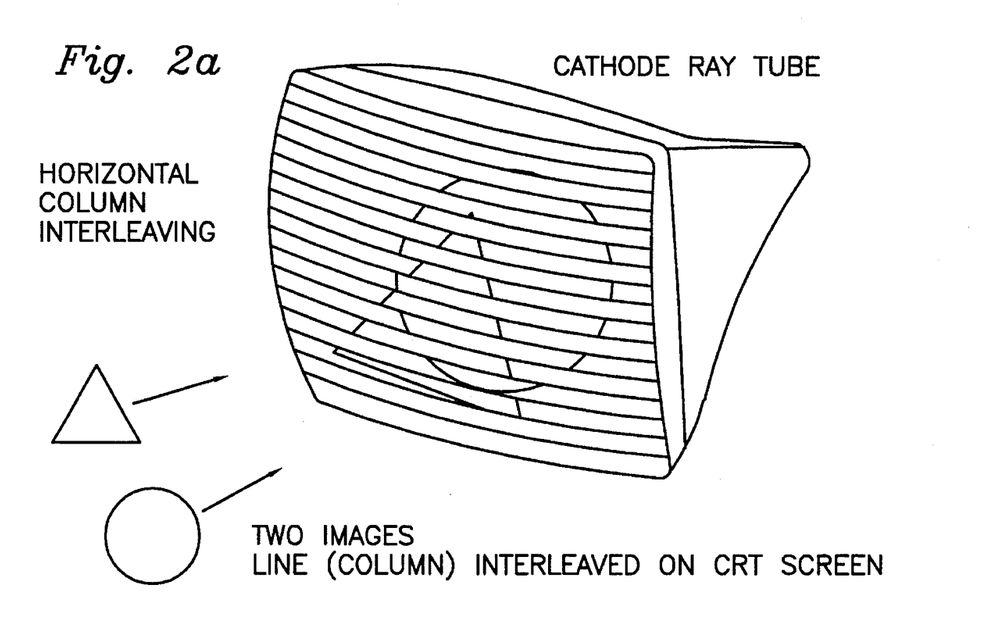
FIGS. 2A and 2B show the effect of showing the two images on alternate video fields.
Figure 2B:
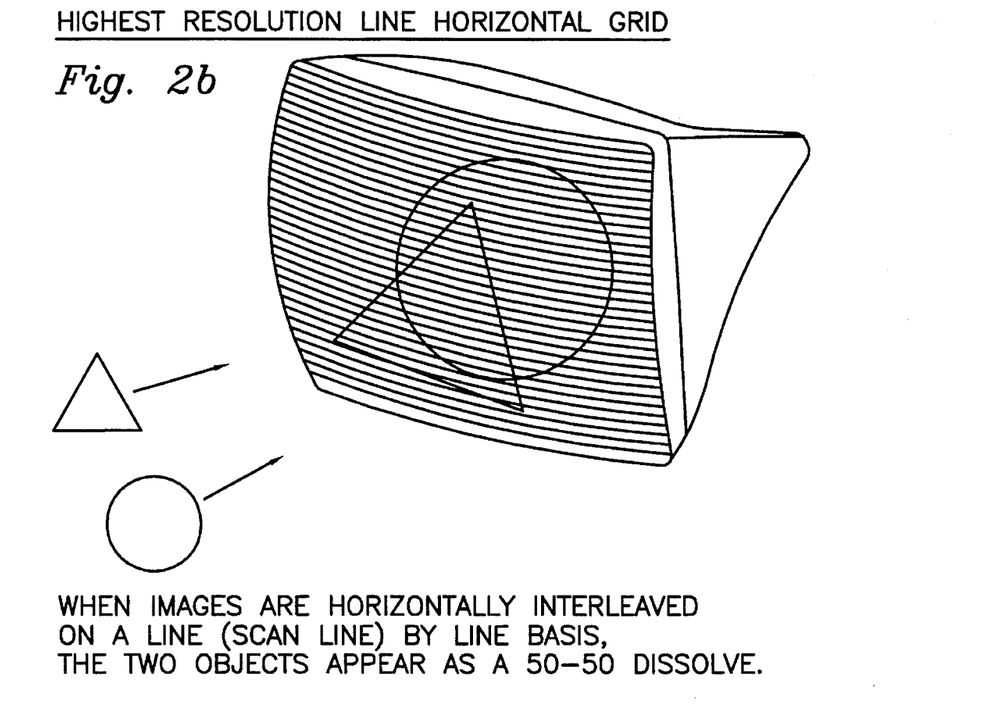

FIG. 2 illustrates how a pair of images are shown on alternate lines of a CRT. The images will appear as a 50/50 dissolve between the two images when no decoder screen is positioned in front of the CRT. The provision of a decoder screen will deliver one of the images to the left eye and the other to the right eye.

By using the alternate field structure of television formats such as PAL or NTSC a high resolution encoding of a stereoscopic image is possible on the screen. The higher the resolution of the encoding the better the resolution of the viewed 3-D image. By placing the stereoscopic pair of images on alternate fields of a video signal the resolution is maximised to the level of a single horizonal line.

It is also possible to produce images at a resolution higher than a single line.

Figure 3A:
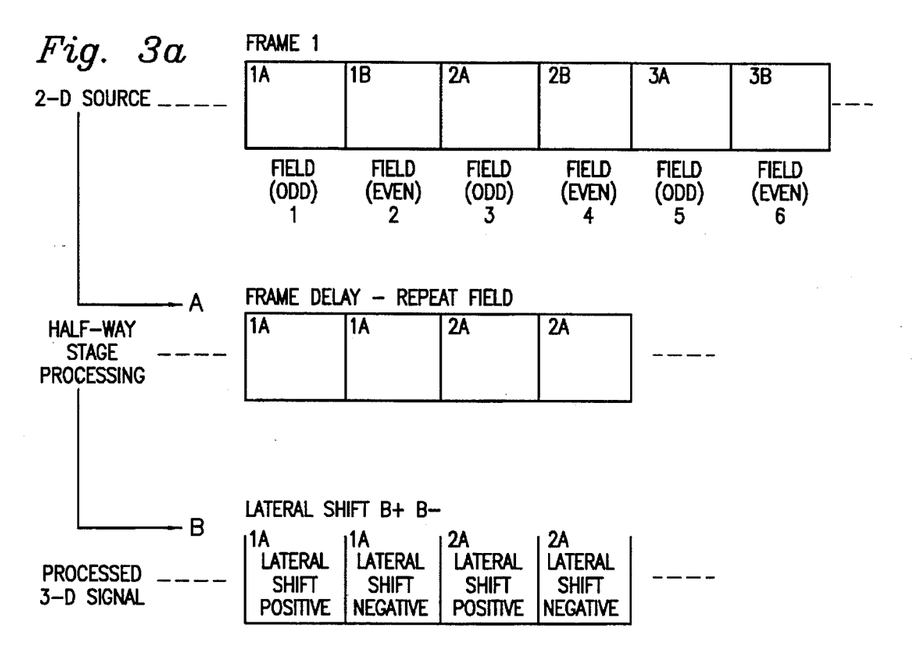
FIGS. 3A and 3B schematically show the processing of 2-D source data for use in the invention.
Figure 3B:
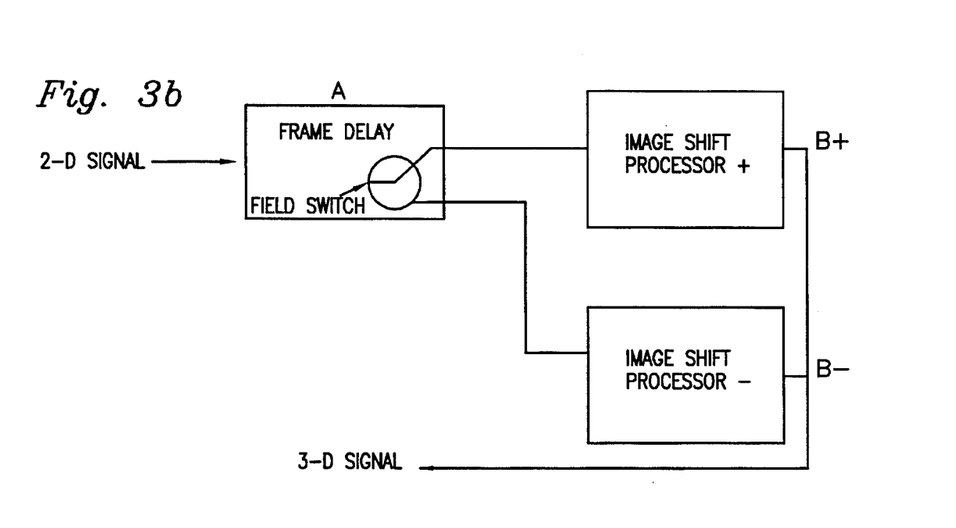
Figure 4A:
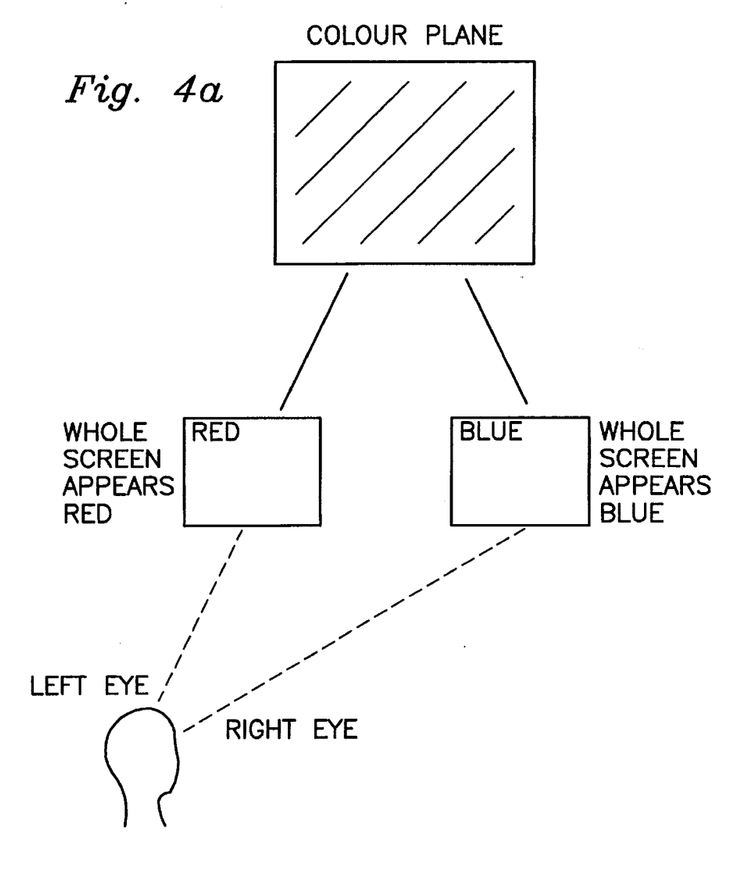
FIGS. 4A and 4B schematically show a system embodying the invention.
Figure 4B:
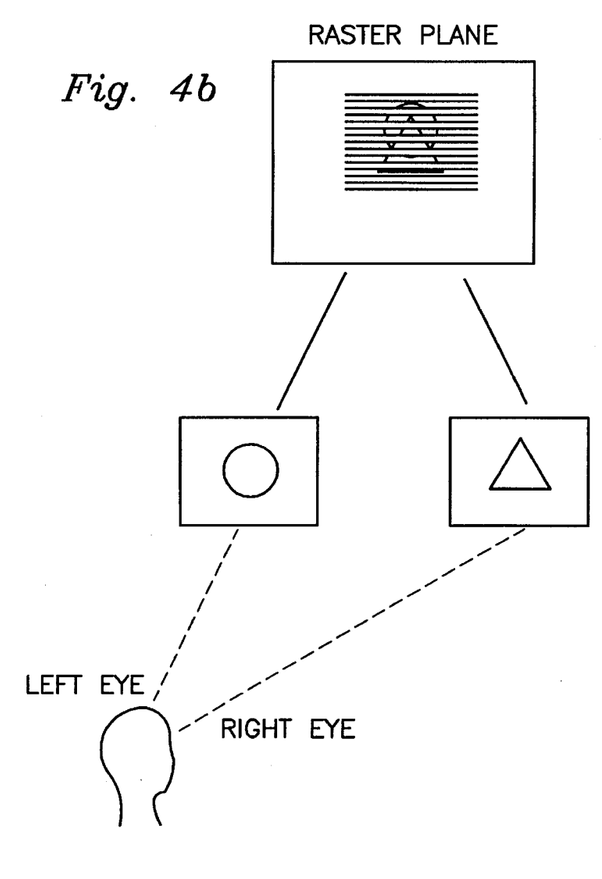

If we process at a resolution level higher than a single line then the time fields would also be line sliced. The horizontal line slicing in combination with the filed interlacing process would build up a two line shift, or a three line shift depending on the resolution. The processing for producing the line interleaved signal from a 2-D source are shown in FIG. 3.

one implementation of a decoder is shown in FIG. 4. In this the raster element of the Raster Lenticular Hybrid comprises alternative horizontal lines of two colour planes referred to as colour 1 and colour 2. One of the colour planes consists of the top half of the visible wavelengths of light and the other of the bottom half of the visible wavelengths of light. Therefore, a first field of a video signal displayed on a CRT will have wavelengths of colour 1 transmitted through a colour filter of colour 1 and the second field will have wavelengths of colour 2 transmitted through a filter or colour 2.

Figure 5:
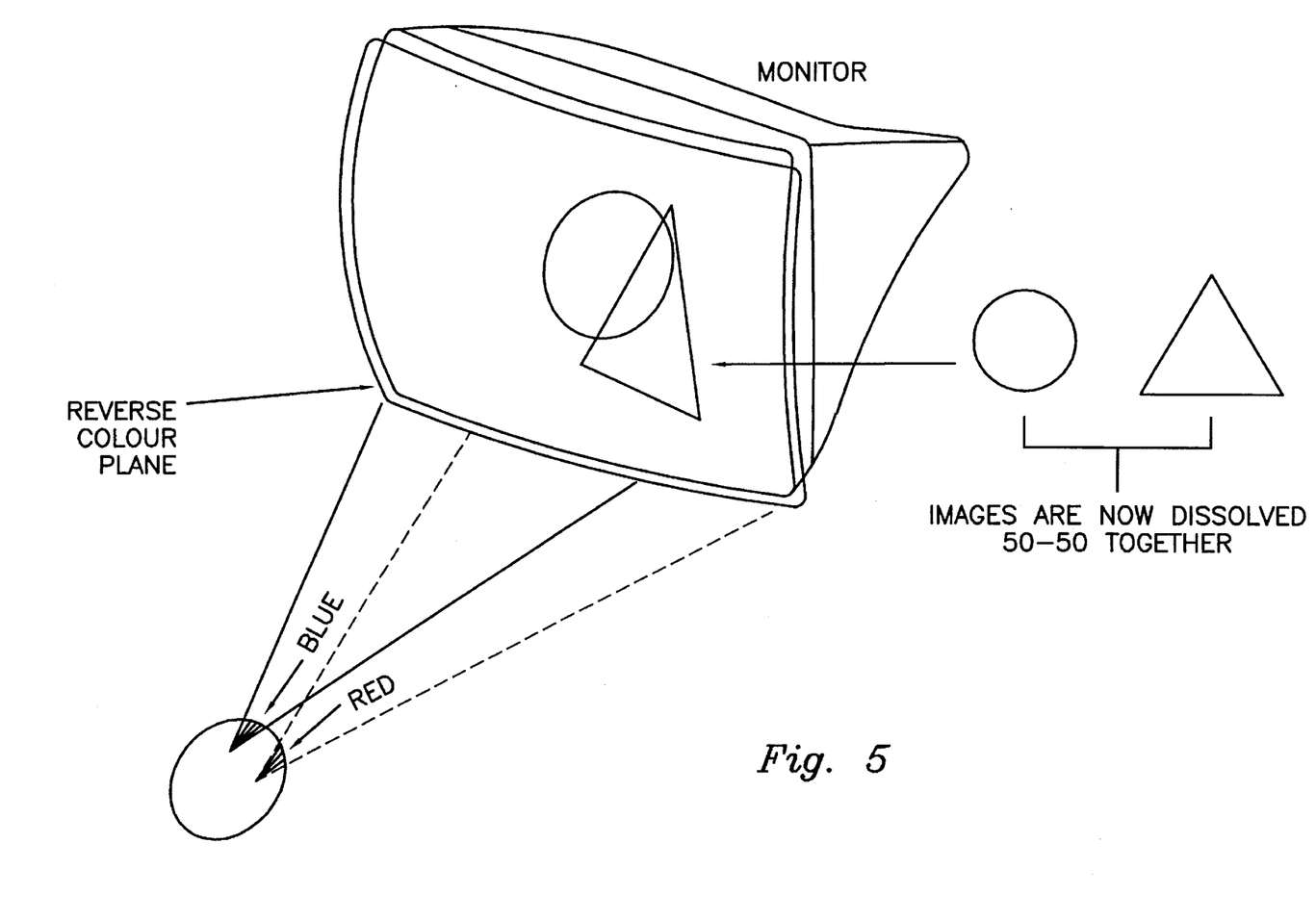
FIG. 5 shows the images shown on a video screen in the embodiment of FIG. 4.

The lenticular element of the decoder re-aligns colour component for each eye and as a result each eye sees the screen as either colour 1 or colour 2 and therefore has either the first or the second video field. This is illustrated in FIG. 5.

Figure 6:
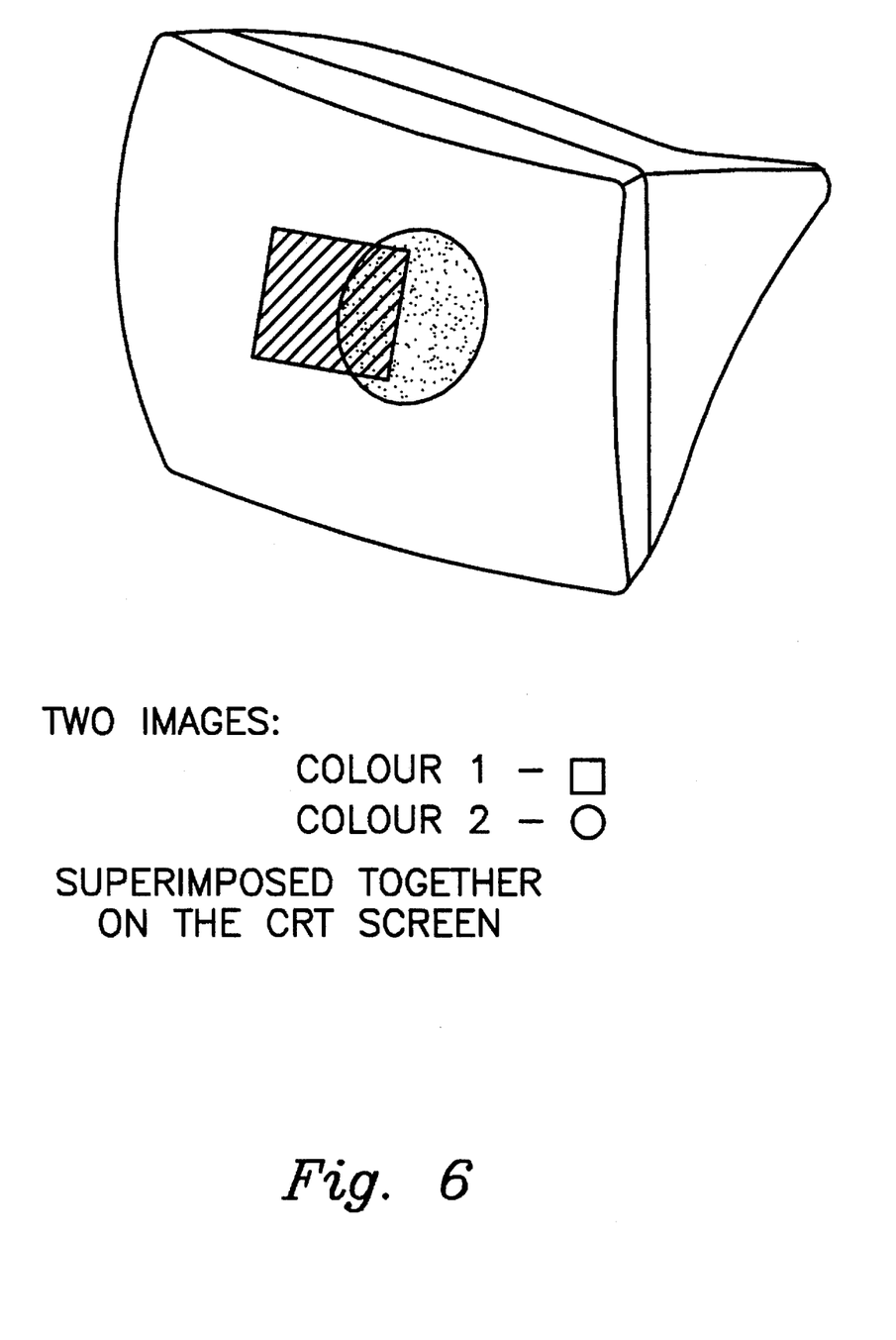
FIG. 6 shows a similar view to FIG. 5.

Preferably the video signal is prior processed so that alternate fields are colour encoded whereby each field will be composed solely of either colour 1 or colour 2 wavelengths. The image which would be seen on the CRT without a decoder screen in place is shown in FIG. 6.

Figure 7A:
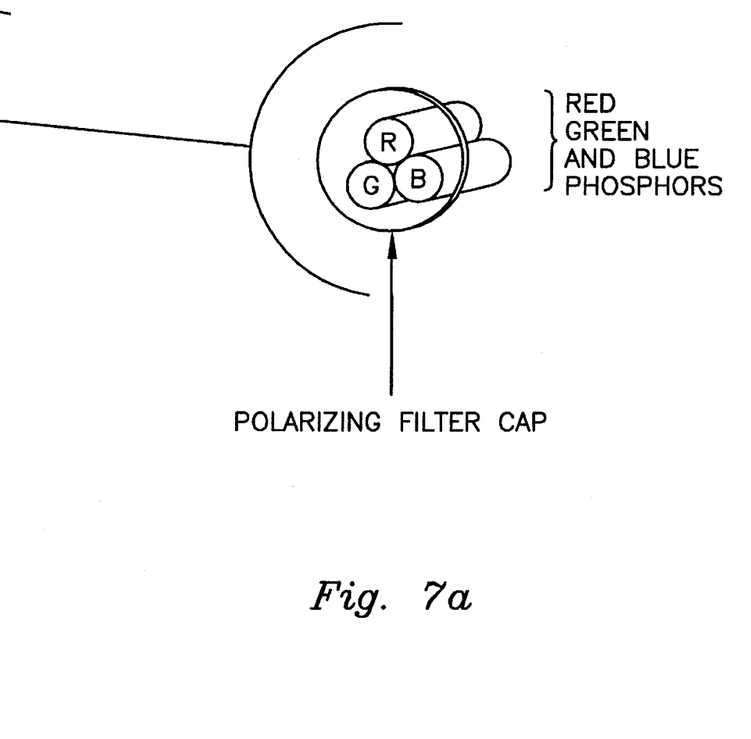
FIGS. 7A and 7B show polarizing filter caps for use in an embodiment of the invention.
Figure 7B:
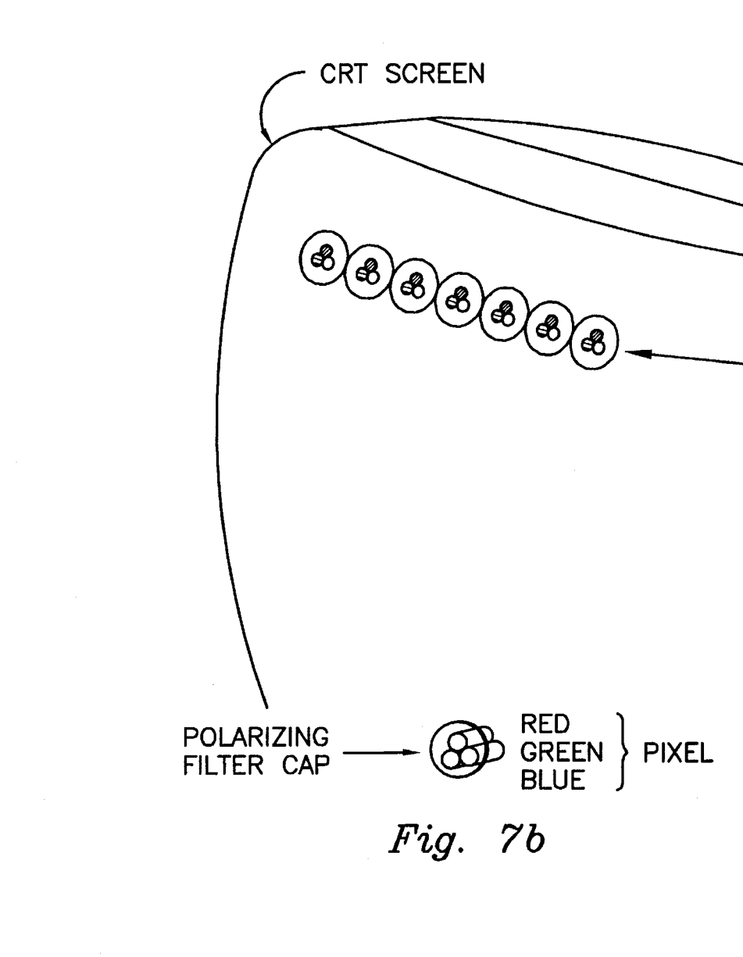

FIG. 7 shows an implementation of the decoder screen which uses plane polarisation. In this phosphors in the CRT are polarised by giving each phosphor a polarising filter cap. There is no overlap of this cap onto a neighbouring phosphor.

Figure 8A:
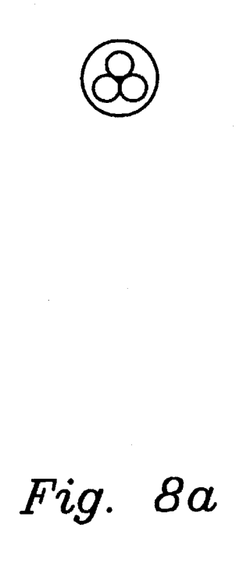
FIGS. 8a, 8b and 8c show various sizes of the caps of FIG. 7.
Figure 8B:
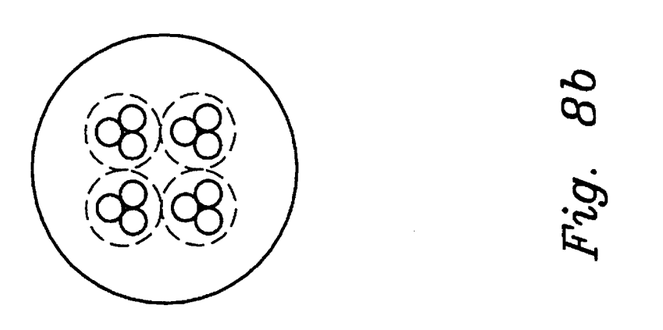
Figure 8C:
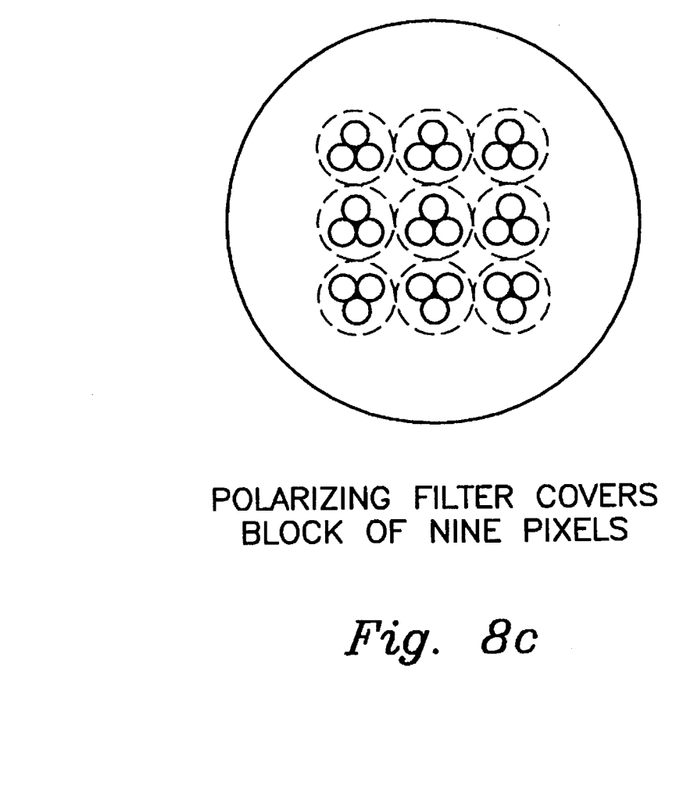

Such an embodiment can be implemented on a checkerboard pattern. If so different group sizes of pixels to be covered by each polarising cap could be selected, e.g. 4, 9, as shown in FIGS. 8a, 8b and 8c.

Figure 9:
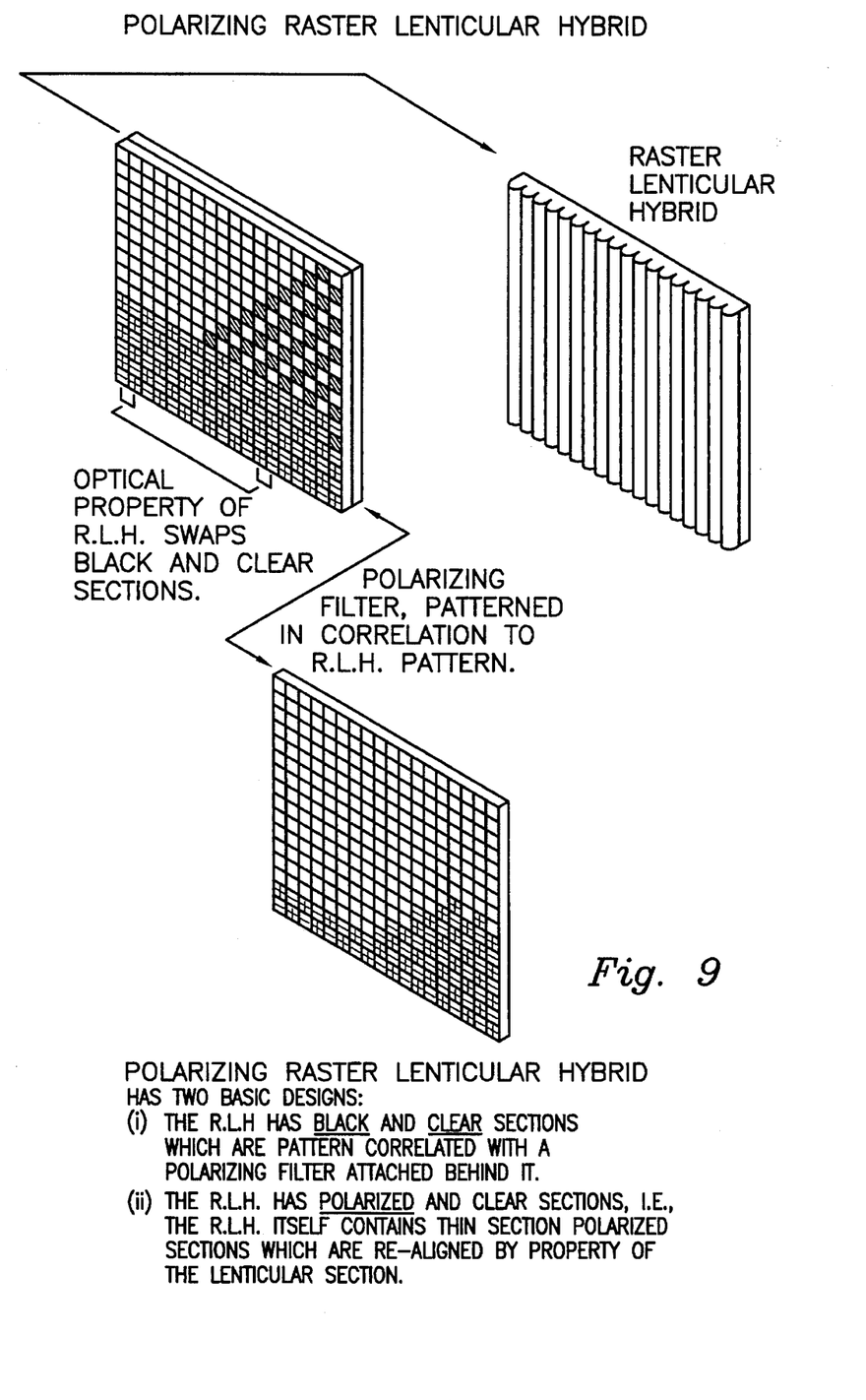
FIG. 9 shows a checkerboard decoder for use with the filter caps of FIG. 7.

A Raster Lenticular Hybrid decoder then sits on top of this polarising CRT is shown in FIG. 9. The raster pattern in this corresponds to the polarising pattern. The Raster Lenticular Hybrid is also plane polarising and is arranged such that one eye sees entirely through one of the polarising filters and the other through the other filter. A similar arrangement is used for a horizontal grid pattern for the raster.

Using such a decoder creates a full screen image for each eye of either one polarising filter or its reverse polarity mate. Thus the two images displayed on the screen are separated for left and right eyes by polarisation.

The use of polarisation in this manner overcomes the correlation and alignment difficulties which exist between the process and the optical decoder. What is now required is accurate alignment between the phosphors of the CRT and the polarising filter caps.

Figure 10:
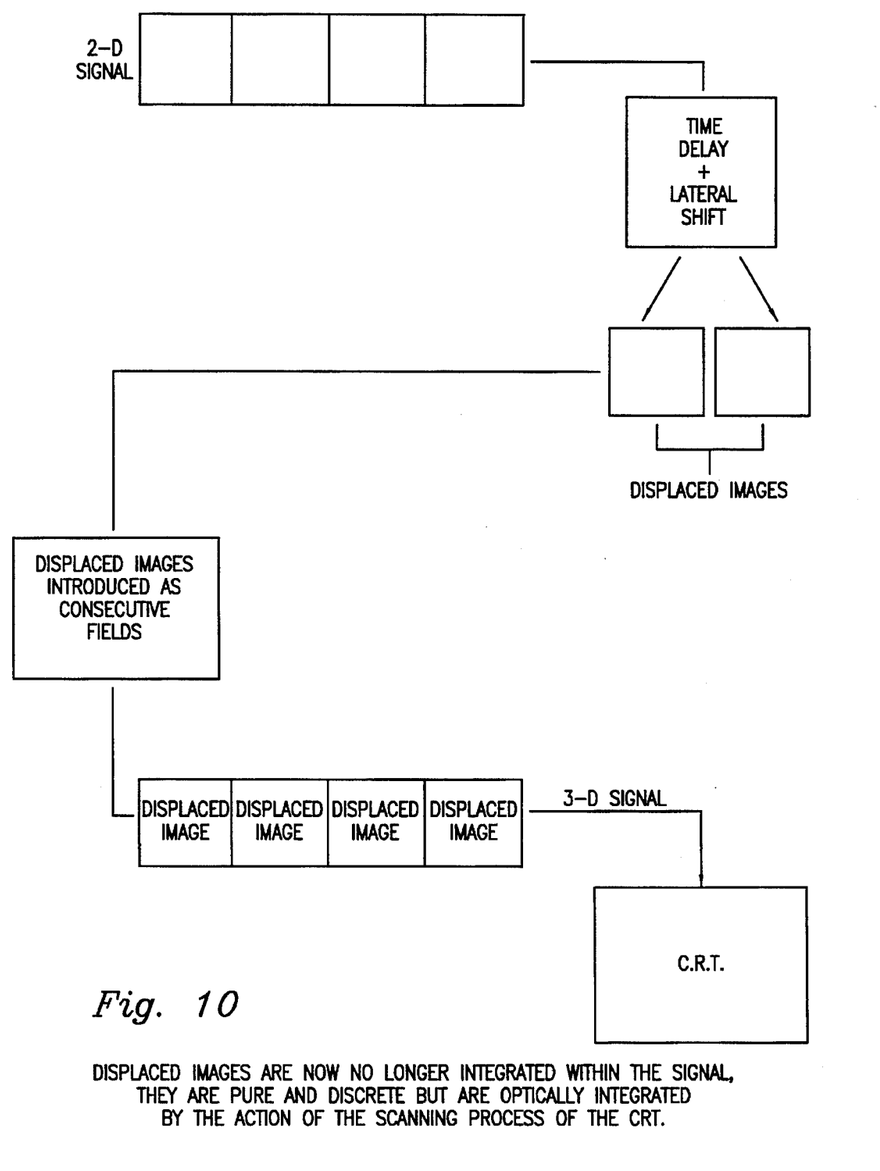
FIG. 10 shows how a 2-D source image is converted to a source image for use in embodiments of the invention.
Figure 11:
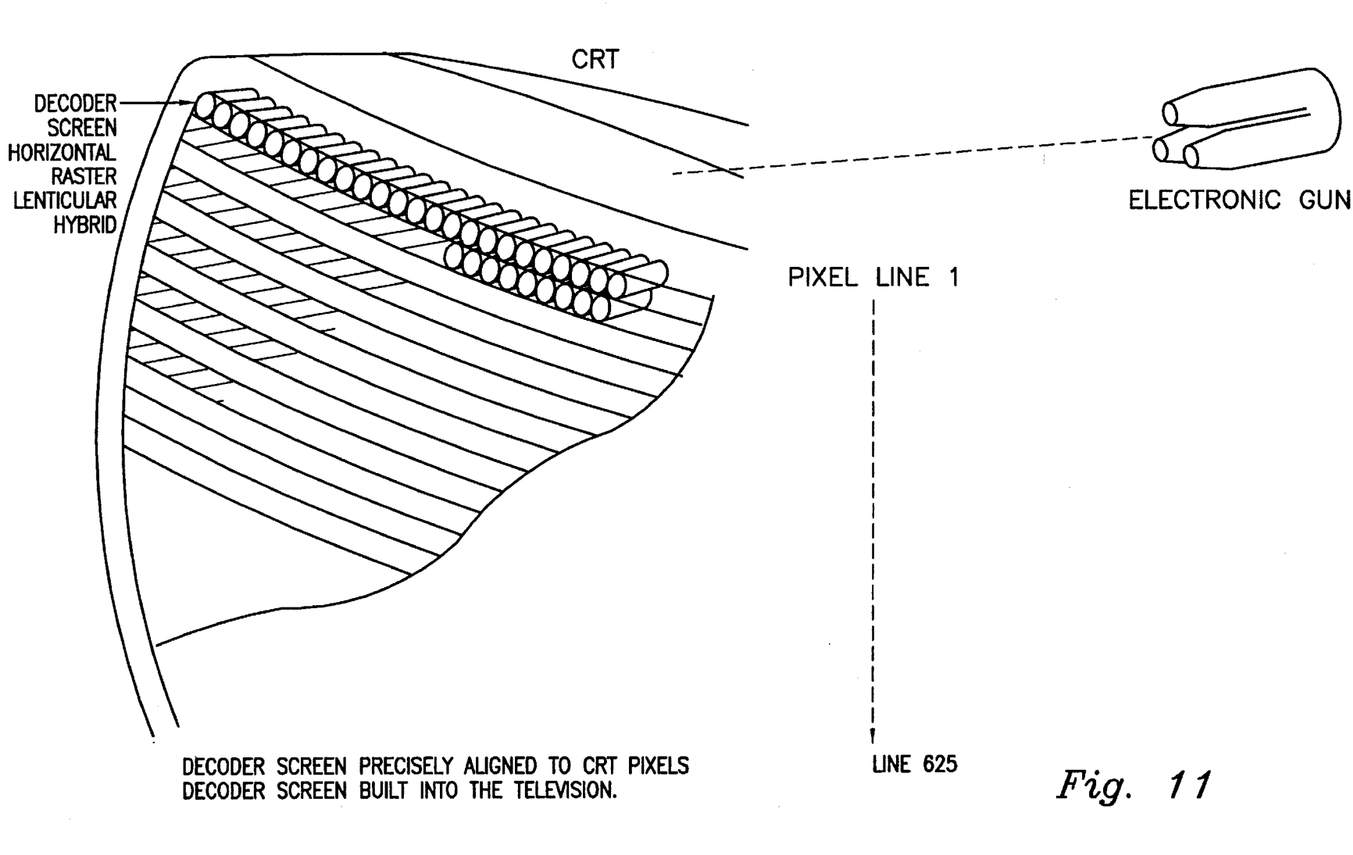
FIG. 11 shows a horizontal grid decoder embodying the invention.
Figure 12A:
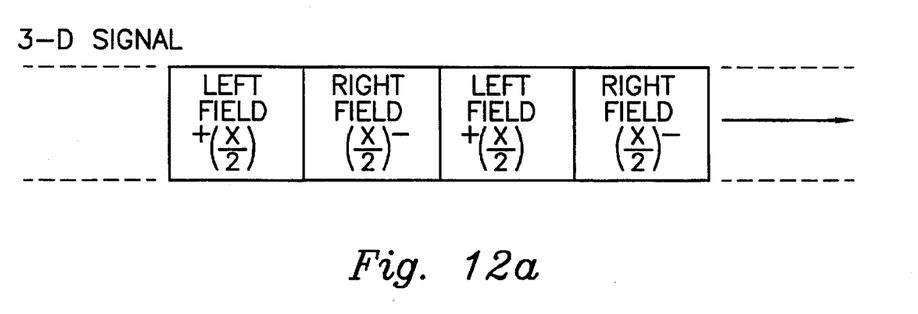
FIGS. 12A, 12B, 12C, 13A, 13B and 13C show the processing of source data for use in embodiments of the invention in more detail.
Figure 12B:
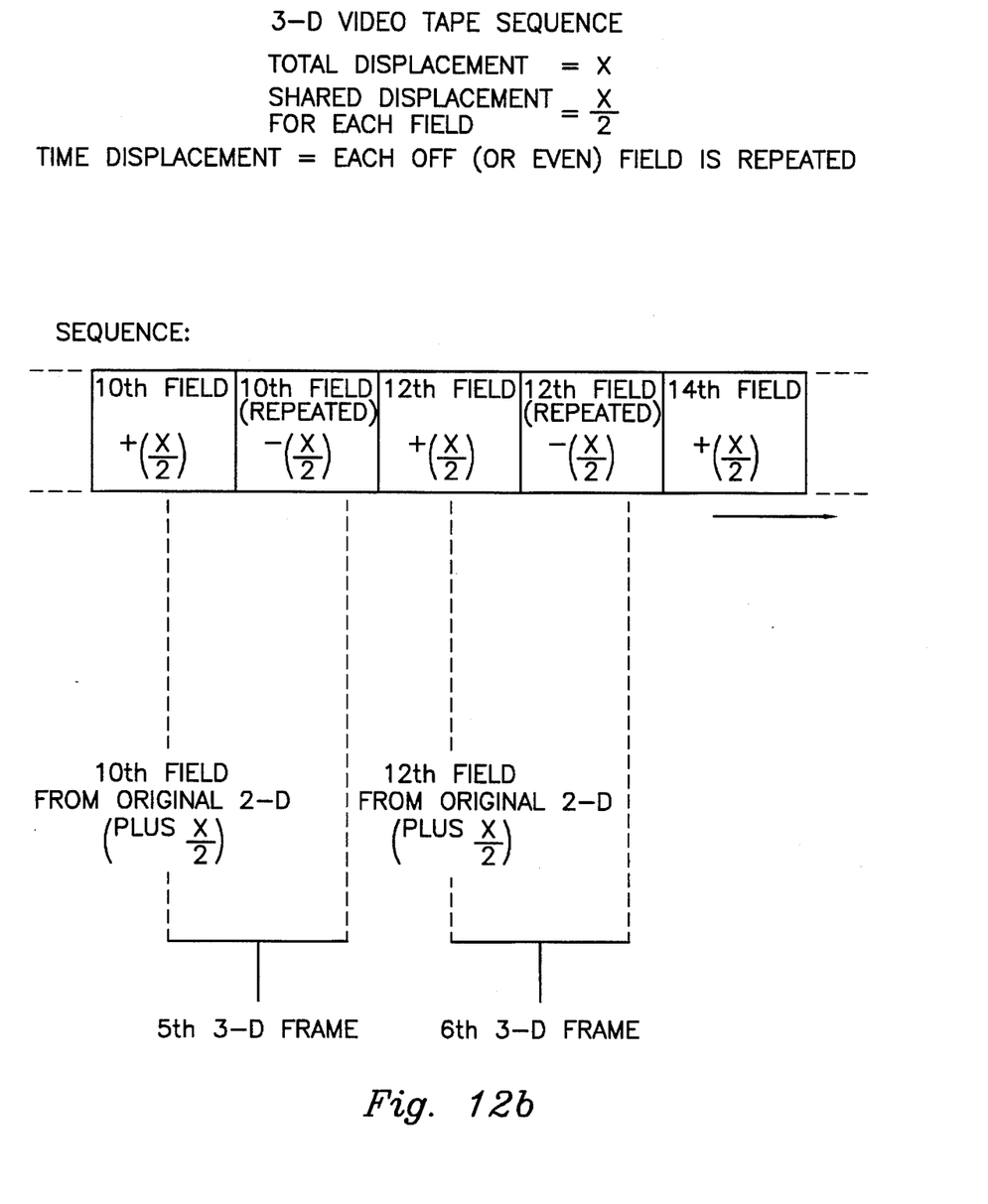
Figure 12C:
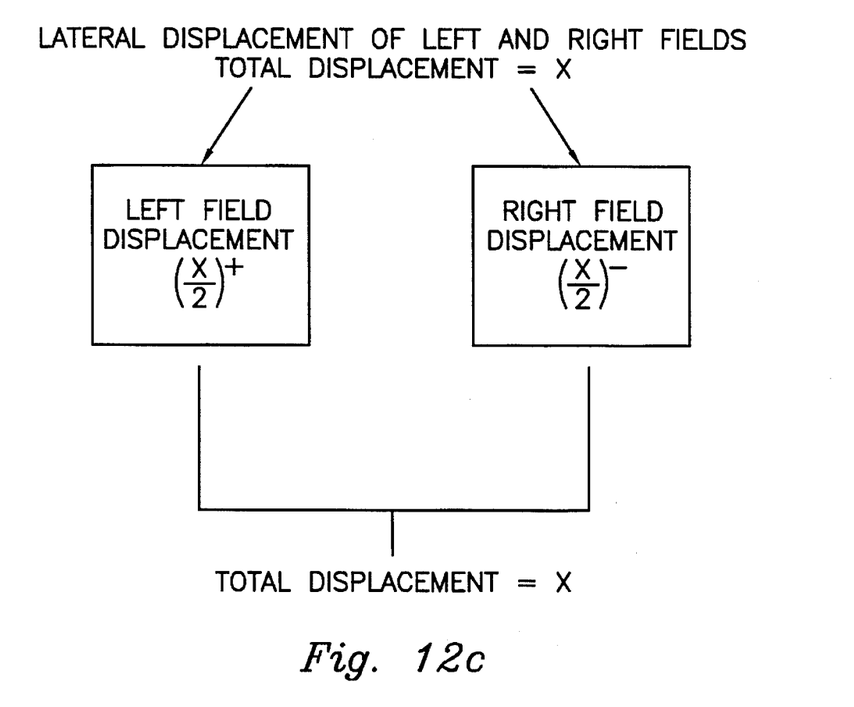

The processing of the image on the CRT in the creation of pseudo-stereo for auto-stereo presentation requires that the two displaced images as created by the pseudo-stereo processes (See FIGS. 10 and 11) are combined yet discrete on the CRT screen. This has been achieved by digital picture processing. This digital picture processing however, had to work within the limitations set by the defining characteristics of the video signal.

By use of a horizontal grid, the auto-stereo processing can now be supported at the highest resolution i.e. on a line by line basis, by the electronic processes of the CRT itself. The screen image on the CRT is a line sliced image made from two images, a line sliced video frame made from two video fields.

If quite simply, we deliver to our CRT—video fields sequentially (i.e. a standard video signal), in which each packet of two fields is in fact our two displaced images—i.e. a frame tie delay of 1/25 (PAL)of 1/30 (NTSC) plus a horizontal displacement—this packet of video fields is then time sliced together (field interleaved) on to the CRT screen, by the standard horizontal scanning cycle of the CRT.

In this way the two displaced images are re-integrated onto the screen, by the same process that presents two consecutive fields simultaneously, it is the decay time of the CRT phosphors together with the persistence of vision which makes each field (the first in our packet 'linger' on the CRT screen to be joined by its successor (the second in our packet).

When the Raster Lenticular Hybrid, with horizontal lines is produced in conjunction with the CRT to a level of industrial precision, then the grid lines of the RLH and the pixel width of the field interlace lines of the CRT will be the same size and correlate precisely.

Of course this could represent a 50% drop in the intensity of the image, in fact because of the refraction of light it will be less than 50%, however there will be a noticeable loss in brightness. For this reason a circuit will be included which upon activation increases the intensity of the illumination of the image, so that the picture as viewed through the decoder screen is of the same brightness. This intensity boost circuit will also ensure that the black lines as contained within the Raster Lenticular Hybrid, virtually is not totally disappear, as the refraction of light further reduces the conscious impact of the horizontal raster lines.

The benefits of the horizontal Raster lenticular hybrid are essentially threefold;

Firstly—when viewing any image we find horizontal lines less distracting when the image is composed of them—as opposed to an image composed of vertical lines of comparable i.e. identical dimensions, this is of course further supported by the fact that when viewing conventional television we are looking at an image that is composed into horizontal lines, so we are already conditioned to horizontal lines.

Secondly—as the standard CRT and the support electronics currently present an image that is electronically scanned horizontally, the current electronic design of the CRT is working with the field interleaving process. The processing, which requires the re-integration of two displaced images, will be effected through the CRT technology which re-integrates two consecutive fields onto the screen. Of course this requires that the fields are correctly modified, but the major alterations to the image that the system requires on the screen, can be achieved through minor alterations to the video signal, even though the image carried through the video signal is significantly modified.

Thirdly—the bandwidth of VHS no longer prevents high resolution processing being carried by a VHS tape. The vertical grid encoding, when taken to the same high level of optical resolution (i.e. the width of the column is reduced to the width of a single pixel of the CRT phosphors) introduces changes to the electronic video signal which cannot be supported by the restrictions of the VHS tape format, and which may cause difficulties with the operations standards of broadcast terrestrial and satellite transmitters.

The processing for the horizontal grid, involves the lateral displacement, being shared over the two displaced fields (images). These two fields must be from consecutive frames, and each field is shown twice, in the first frame it will be the positive displacement but in the following frame it will be repeated but with the negative value displacement.

As a consequence the signal when compared with the original video signal, will be composed of laterally shifted odd fields, or laterally shifted even fields.

Figure 13A:
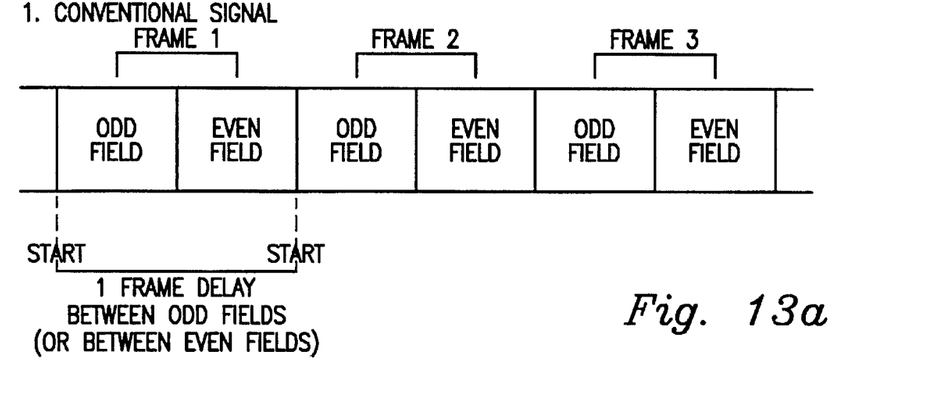
Figure 13B:
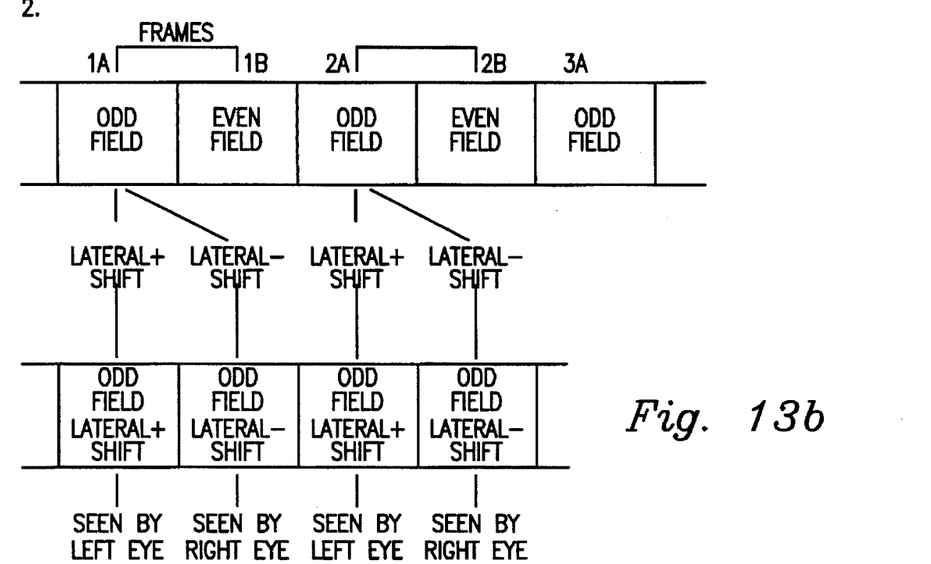
Figure 13C:
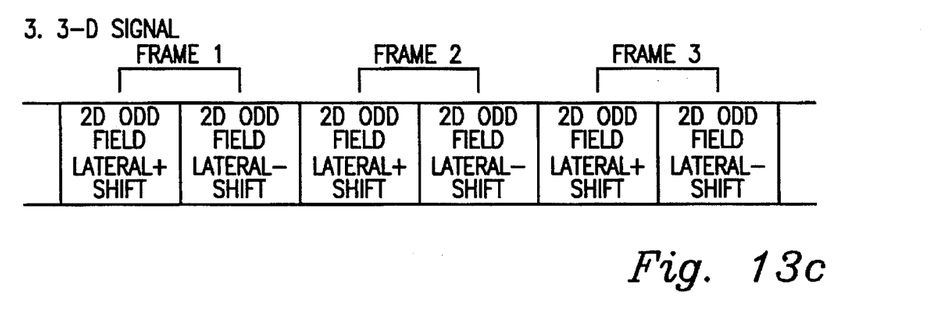

When compared with the original signal, either all of the odd fields or all of the even fields are omitted from the signal which results. The reasoning behind this can be seen in the fact that the odd fields have the correct time delay between them (See FIG. 13), as do all of the even fields.

Therefore, the principle is as follows: in conventional video each eye sees the even field followed by the odd field, at the same time as the other eye sees it; in Horizontal Grid the left eye sees each odd field but with lateral shift, followed by the next odd field with the same lateral shift, at the same time the other eye sees the previous odd field with an opposing lateral shift, followed by the next odd field with the same opposing lateral shift. In the encoding process even fields may be used in place of odd fields, but always one is used in total exclusion of the other. Each eye is always a frame period and a lateral shift away from seeing exactly what the other eye is seeing.

One of the additional benefits of this process involving purely odd fields or purely even fields, is that by actually losing 50% of the original picture information, we have not only converted mono into stereo, but also we have sharpened the image, the display of the two fields (odd plus even) to both eyes actually degrades the images, as the two fields (odd plus even) are neither exactly physically aligned nor precisely contemporaneous, i.e. there is always a discrepancy between them and this de-resolves the image.

In the signal for the horizonal grid, there is no recombining of two images within the signal. Each field is a pure mono 2-D image (albeit with lateral displacement), it is the CRT scanning system which effects the re-integration, achieving the two displaced 2-D images, within a single frame.

The properties of the horizontal grid—Raster Lenticular Hybrid which enables it, when implemented in the highest resolution, to send a single field to each eye means that not only will it convert a signal into a three dimensional image, but it will also convert a conventional 2-D signal into a high definition image with a lower level—but definitely discernable, sensation of depth.

The reasons for this sensation of high definition is that each eye is now seeing a pure field(+black raster lines in place of the missing field, but with an intensity boost to 'refract out' or minimise the presence of the lines). Each eye not sees an image in which the slight blur caused by the discrepancy between two fields, is removed. This results in a sensation of increased resolution, indeed the two fields of conventional video, do actually slightly de-resolve the picture.

AUTOSTEREO FOR LARGE SCREEN PRESENTATIONS (THEATRICAL)

The large screen auto-stereo discussed in this implementation combines the Raster Lenticular hybrid with the principles of Plane Polarizing Systems.

FORWARD PROJECTION

The image—the displaced stereo pair, is generated either by two projectors running in constant synchronization, or by a single projector with its film frame divided into two, each image recombined with its neighbour on the screen by a special lens.

This projected stereo image, is polarized inversely for each image and is then projected onto our special screen. The Screen consists of four layers:—

1. The Lenticular Layer
2. The Raster Layer (the alternating pattern)
3. The Polarizing Layer
4. The Reflective Screen These four layers combine to separate the two images projected onto the screen, into two images one for each eye, for a variety of viewing positions.

The combined optical action of these four layers, is as follows:—

The two projectors (or single split frame projector) aim the stereo pair at the screen, the combined image passes through the lenticular layer—with minimum gross effect (a little ray convergence, which merely counters the expansions of the image-ray divergence from the projector lens). The raster pattern, which in the majority of cases will be the horizontal pattern from the three most common patterns:

1. Horizontal black lines.
2. Vertical black lines.
3. Chequerboard squares.

The raster pattern which is both constructed and alternated by the optical properties of the lenticular layer, in this case into the alternating pattern of horizontal black and transparent lines, exists in the raster layer as a lattice pattern. The stereo image passes through this lattice pattern with no discernable effect save a slight drop in illumination intensity.

The polarizing layer is composed of strips of alternating polarity. This layer immediately converts the polarized stereo image into horizontal strips of alternating left and right stereo image.

It is important to note that the gauge of the polarizing strips is identical to that of the constructed raster pattern gauge; and that this gauge is independent to the lenticular layer.

The resulting image now composed into left and right image, plane polarized horizontal strips, is then reflected back in the opposite direction by the reflective screen which can be either of conventional material or of special polarized retaining material.

Going back through the polarizing layers, the existing polarity of the image is simply reinforced, and otherwise unchanged from the horizontal strips of the left-right stereo image.

Passing once again through the lattice pattern of the raster layer, there is no change to the image save a slight loss in intensity (one should bear in mind that the image is being generated by a twin light source).

However, on passing through the lenticular layer, the lenticular lenses combine with the raster pattern to block 50% of the image for each eye. The combined action of the lenticular layer and the raster layer has been well documented elsewhere in the previous sections of this work. This combined action results in the raster pattern obscuring for the left eye all of the horizontal polarizing strips which comprise the right stereo image—the reverse is the case for the right eye.

In this way the audience sees a stereo image, on the large screen, without viewing spectacles.

Once again either two or one split frame projector is employed. This time the polarized projectors are aligned behind the four layer Screen. In this implementation of the Screen the positions of the reflective screen and the polarizing layer are reversed.

As a result the stereo image is converted into horizontal polarized strips before it impinges upon the back of the reflective screen.

The reflective screen is then back-illuminated by an image that has the left and right stereo views, separated into horizontal strips—the polarization does not survive the forward reflection from the screen, but this does not matter as the gauge of the horizontal strips corresponds to the raster gauge of the raster lenticular hybrid first layer.

The raster lenticular hybrid bi-layer then acts on the image on the reflective screen in the same way that it did on the polarizing layer in the forward projection implementations.

In this way the audience sees a stereo image on the large screen spectacles.

It is important to stress that because there need be no correlation between the gauge or the axis of the image and the gauge of the lenticules, the majority of the problems attendant with past lenticular systems, where image gauge (vertical strips only) and lenticular had to correspond directly, have now been swept away.

DOMESTIC TELEVISION: 'THE LEFT/RIGHT CONSIDERATION'

The question of dedicating the left eye to a left image and the right eye to a right image cannot be achieved for auto-stereo screen, without some means of aligning the position of the viewing audience to a required degree of accuracy.

Without this alignment it would be arbitrary as to which eye sees the left or the right image, even though whichever one of these it is the other eye will see its opposite, and therefore the viewer will experience 3-D.

We have already determined in many cases, that the sensation of 3-D is present in both of the left eye to left image or left eye to right image orientations. The exact nature of the 3-D illusion changes, but the fact of it remains.

However there are some cases where an exact alignment is required for the fact of the 3-D illusion, or is required to generate the specific type of 3-D illusion intended. Under such circumstances, alignment indicators must be included in the display, either LCD's mounted in the television frame or alternatively, small sections of the screen, preferably at the top left and right corners or the bottom left and right corners, must be dedicated to a software alignment included in the visual display.

By alignment indicator we refer to a red light source and a green light source which is also part of an auto-stereo display, so that when the left eye sees the red light the left eye is in the correct position to see the left image, and when the right eye sees the green light it is in the correct position to see the right image. In this way proper alignment may be achieved and maintained.

Of course in this system the individual must align themselves to the image; however the parameters which define each viewing position will allow for normal slight side to side movement of the head without loss of alignment.

OVERCOMING PARALLAX

The issue of parallax is a mixed blessing in 3-D system for it is parallax, parallax between the eyes, which is partly responsible for the observance of 3-D in normal vision. However parallax also creates problems in the construction of 3-D viewing systems where the intention is to persuade the viewer that a 2-D reality is a 3-D image.

In the case of the Raster Lenticular Hybrid, when the raster pattern has the same dimensions as the horizontal scan lines, i.e. designed to the same resolution of the scan lines, in order to totally occlude all alternate horizontal scan lines and therefore one field, for one eye, and totally occlude the other scan lines for the other eye, when such is the case then it means that a misalignment of just half a scan line, will result in each eye seeing a double image; a misalignment of one scan line will result in each eye seeing different halves of the stereo pair over the area of the screen.

In both of these cases the misalignment will result in a break down and loss of the 3-D illusion.

Now given that the thickness of the glass, between the outer layer of the screen and the layer of the screen phosphors—the image pixels, is always thicker than the height of the phosphors that make up a scan line, we have as a result a classic parallax error condition, particularly when the screen is curved.

The obvious solution to this in CRT design is to have the television screen as planar as is possible and the glass between the decoder screen and the phosphor layer as thin as is possible, the greater the degree to which these two (conflicting) conditions can be simultaneously satisfied, the lesser will be the parallax error. In LCD television both of these conditions are met to a much greater degree.

However there is a less obvious solution, that is capable of totally eradicating parallax error, and it involves bringing the pixel plane flush up against the back of the decoder screen, so that there is no gap between them.

In conventional CRT designs the phophor plane and the pixel plane are one and the same. As a result of this, the fact that the phosphor plane exists within the inner vacuum of the CRT means that it exists behind a layer of glass—the layer of glass that seals and maintains the essential vacuum. This layer of glass is thicker in more modern designs of flat square televisions.

As a consequence of this, unless the raster lenticular screen is designed as the end piece of glass that forms the CRT and seals the vacuum, the phosphor plane and the raster lenticular hybrid screen will always be separated by glass, there will be no flush fit and therefore there will always be a parallax problem of some degree, which will need to be minimised.

The solution of designing the raster lenticular decoder into the glass at the end piece of the CRT, so that it is flush against the pixels, would require special preparations in glass, but would be a solution.

In order to bring the pixel plane up against the decoder screen, we must separate the pixel plane from the phosphor plane.

To achieve this important separation, we must prevent the phosphor plane from being the pixel plane, as well as translocating the pixel plane.

The properties of glass fibre-optics points the way, the property of the inner walls of a rod of glass to reflect and therefore to propagate light, enables a phophor at one end of a fibre-optic glass fibre to produce a pixel at the other end of the fibre. The length of the fibre gives the degree of translocation, also if the fibre-optic end totally occludes the phophor, the phosphor plane will not now be the pixel plane; this meets both our conditions.

If a CRT was designed and constructed (possibly in two sections) such that the end piece layer of glass that is attached adjacent to the phosphor layer was in fact a solid layer of bundles of optic fibres, with a cut in transverse section forming the inner and outer layer of the glass layer.

These bundles of glass fibres could be circular or hexagonal, one can envisage a honeycomb network. The important point of this layer, is that its inner surface will be flush with the phosphor layer where it will also be maintaining the integrity of the vacuum, and its outer layer will become the pixel plane which can be matched—flush with the raster lenticular hybrid.

Should this fibre optic layer have difficulty coping with the pressure of the vacuum then another outer layer of glass could be added.

Fibre optics are not the only way of achieving this translocation of pixel plane from phosphor plane. Thin layers of glass all cut in transverse section would achieve the same purpose. In this case, however, each glass layer would have to be matched to each horizontal scan line. As a consequence there might, for example, be 625 layers of strips of glass, each layer running horizontally along the television, each layer stacked vertically on top of the other.

As was the case with the fibre optics, the layers are to be matched to each horizontal scan line. As a consequence there might for example by 625 layers of these strips of glass, each layer running horizontally along the television, each layer stacked vertically on top of the other.

As was the case with the fibre optics, the layers are cut in transverse section creating an inner plane and an outer plane, made up of the edges. The edges of the inner plane are all flush with the phosphor plane (or as close as is possible), the edges of the outer plane, transmit light, now unrestricted by the top and bottom horizontal edges, which reflect the light inwardly in transmitting it with negligible attentuation to the outer plane. The outer plane then acts as a pixel plane. It is against this 'outer plane' that we place our raster lenticular hybrid decoder screen.

The properties of glass are well known and whatever the shape of the elements, strips, rods, cuboids or hexagonal prisms, the intention is that at one end, they are proximal with the phosphors and at the other end they are proximal with our decoder screen. In between, the inner glass surfaces of our elements are responsible for the contained transmission of light.

In this way we achieve the objective of having our decoder screen flush with our pixel plane, which is the only way to reduce parallax to negligible levels.

In order to ensure a true alignment of scan line to phosphor, i.e. to ensure that the electron gun writes the scan line in the same place—to the same phosphor locations, for each new frame, the interposition of a small strip of light detecting diodes, which placed over a small region of the phosphor plane, would be required to detect any drift in the electron beam; this diode strip could be part of a feed back loop, which internally rectified the beam voltage or the magnetic field strength so as to maintain scan line accuracy.

Both of these techniques will be required for cathode ray tube displays, when we desire single scan line accuracy, with each eye seeing either only the odd fields or the even fields of an interlacedfield video scan.

For live recording of sporting and/or fast paced motion sequences, a special video camera will be required.

This camera will operate at 100 Hz and will never allow the two images which are presented simultaneously via the auto-stereo screen to have, in terms of the displacement component of the algorithm, a time displacement greater than 1/100th of a second; which will means every field is shown on a 100 Hz television, but on a standard television the signal supplied must be processed in the following fashion.

The camera will record 100 images every second, 100 video fields every second. Of the 100 video fields which comprises the signal for the duration of a second, every other pair of consecutive fields is discarded. The resulting 50 fields are then sent to a pair of fieldstores, where they are converted into fields with twice the duration, as a result each video field now being 'shown' at the rate of fifty every second, has an image that was recorded at one-hundredth of a second.

As a consequence the time displacement electronically between the fields is one-fiftieth of a second, but optically and kinetically it is one-hundredth of a second. This signal is then subjected to lateral displacement processing and then sent to an auto-stereo CRT for stereo viewing.

In this way the large displacements generated by fast moving objects may be tamed, by using a 100 Hz video or cine camera, and the processing described above.

This system when implemented with the horizontal decoder screens, produces software that always encodes a 1/100th of a second motion delay between the odd fields and the even fields, which are shown on the screen at the same time, so that the left eye and the right eye seen 1 1/100 of a second motion delay (plus lateral displacement): and as a consequence the 1/50 of a second (2/100th of a second) motion delay. The product of discarding the two fields is allowed to fall between the even fields and the odd fields, so that it is diminished in the initialization of a new frame.

I claim:

1. A decoder screen for use in an imaging system in which said decoder screen is disposed, in use, between a viewer and a composite image which contains alternate portions of first and second images which together form a stereoscopic pair;

said decoder screen comprising:

a substrate bearing a pattern of alternating clear and opaque areas; and an array of lenticular elements; wherein said pattern of alternating clear and opaque areas is a pattern of horizontal lines which co-operates with said array of lenticular elements so as to mask light coming from said first image of said stereoscopic pair from a first one of said viewer's eyes and to mask light coming from said second image of said stereoscopic pair from the other of said viewer's eyes.

2. An imaging system comprising a display for a stereoscopic pair of images, image data from a first one of said stereoscopic pair of images being, in use, displayed on a first plurality of horizontal lines of said display and image data from a second image of said stereoscopic pair being displayed on a second plurality of horizontal lines alternating with the first such plurality; and a decoder screen disposed between the display and a viewer; said decoder screen comprising:

a substrate bearing a pattern of alternating clear and opaque areas; and, an array of lenticular elements; wherein said pattern of alternating clear and opaque areas is a pattern of horizontal lines which co-operates with said array of lenticular elements so as to mask light coming from a first one of said first viewer's eyes and to mask light coming from said second image of said stereoscopic pair from the other of said viewer's eyes.

3. An imaging system according to claim 2 wherein said display is a projection screen.

4. An imaging system according to claim 2 wherein said display is a cathode ray tube.

5. An imaging system according to claim 4 wherein said first plurality of horizontal lines comprises a first video field scanned by the CRT and said second plurality of horizontal lines comprises a second video field interlaced with said first video field.

* * * * *